(12) United States Patent
Aoyama (10) Patent No.: US 7,078,881 B2
(45) Date of Patent: Jul. 18, 2006

(54) VEHICLE AC GENERATOR APPARATUS HAVING IMPROVED GENERATOR CONTROL APPARATUS

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 136 days.

(21) Appl. No.: 10/930,898

(22) Filed: Sep. 1, 2004

(65) Prior Publication Data

US 2005/0046395 A1   Mar. 3, 2005

(30) Foreign Application Priority Data

Sep. 1, 2003 (JP) ............................. 2003-308233
Jun. 30, 2004 (JP) ............................. 2004-192379

(51) Int. Cl.
*H02P 9/00* (2006.01)
*H02P 9/10* (2006.01)

(52) U.S. Cl. .............................. 322/28; 322/27; 322/37

(58) Field of Classification Search .................. 322/24, 322/25, 27, 28, 37, 59
See application file for complete search history.

(56) References Cited

U.S. PATENT DOCUMENTS 4,831,322 A * 5/1989 Mashino et al. ............... 322/28
5,157,321 A * 10/1992 Kato et al. ..................... 322/28
5,262,711 A * 11/1993 Mori et al. ..................... 322/28
6,075,348 A    6/2000 Iwatani et al. ................. 322/28
6,424,127 B1 * 7/2002 Ishii .............................. 322/36
6,462,517 B1 * 10/2002 Asada ........................... 322/28
6,700,355 B1 * 3/2004 Aoyama et al. ............... 322/36
6,734,653 B1 * 5/2004 Taniguchi et al. ............ 322/24
7,009,366 B1 * 3/2006 Maehara ....................... 322/28

FOREIGN PATENT DOCUMENTS

JP    U 57-183031    11/1982
JP    A 5-111300    4/1993
JP    A 10-225008    8/1998

* cited by examiner

*Primary Examiner*—Nicholas Ponomarenko
(74) *Attorney, Agent, or Firm*—Oliff & Berridge, PLC (57) ABSTRACT

A vehicle AC generator apparatus includes one or more rectifier elements for rectifying a generated AC voltage, and a generator control apparatus which monitors the voltage difference between opposing terminals of a rectifier element, to thereby detect the commencement of electrical generation upon engine starting as the time point at which the polarity of the voltage difference first corresponds to the forward conduction direction of the rectifier element. Controlled parameters such as the current supplied to a charging warning lamp and the excitation current of a generator winding are changed appropriately when generation commencement is detected.

16 Claims, 2 Drawing Sheets

FIG. 1

VEHICLE AC GENERATOR APPARATUS HAVING IMPROVED GENERATOR CONTROL APPARATUS

CROSS-REFERENCE TO RELATED APPLICATIONS

This application is based on and incorporates herein by reference Japanese Patent Application No. 2003-308233 filed on Sep. 1, 2003 and 2004-192379 filed on Jun. 30, 2004.

BACKGROUND OF THE INVENTION

1. Field of Technology

The present invention relates to an AC generator apparatus for use in a motor vehicle, where the term "AC generator apparatus" is used in the following description to signify a generator apparatus driven by a vehicle engine, which generates an AC voltage and rectifies that AC voltage to derive an output DC voltage.

2. Description of Prior Art

A vehicle AC generator apparatus supplies electric power, as a rectified DC voltage, to the battery of the vehicle and to various electrical equipment, with the output voltage of the generator regulated to a predetermined value by a generator control apparatus. In general, the generator control apparatus (sometimes referred to as voltage regulator) adjusts an AC voltage produced by the generator by intermittently interrupting excitation current of an excitation winding (sometimes called the field coil) of the generator. Such a vehicle AC generator apparatus also is provided with a warning function whereby a charging warning lamp serves to indicate when the apparatus has started to perform normal generation, and so has started to supply a charging current to the vehicle battery. Such an AC generator apparatus is described for example in Japanese Patent Laid-open No. 10-225008 (pages 2–3, FIGS. 1–5).

With a generator control apparatus used in such a prior art type of vehicle AC generator apparatus, a phase voltage produced by the generator apparatus is smoothed by a smoothing capacitor, and the resultant voltage is inputted to a voltage comparator. When that voltage exceeds a predetermined value, the output from the comparator is applied to effect changeover of the charging warning lamp from the on (i.e., lit) condition to the off (i.e., extinguished) condition, to thereby notify the driver of the vehicle that normal generation by the AC generator apparatus has started. With such a generator control apparatus, if an excessive level of leakage current occurs in the rectifier elements (in general, rectifier diodes) of the AC generator apparatus, then while electrical generation is not being performed, that leakage current will flow through a resistor that is used to detect the phase voltage and hence will flow into the aforementioned smoothing capacitor. As a result, the charging warning lamp may remain in the off state after the vehicle ignition has been switched on but no electrical generation is being performed. Hence, the vehicle driver may be given an erroneous indication.

For that reason, it has been proposed in the prior art to provide a generator control apparatus incorporating a leakage compensation circuit, whereby the frequency of the phase voltage is detected, and whereby charging of the aforementioned smoothing capacitor is performed only when the frequency exceeds a predetermined threshold value. It is thereby possible to prevent the smoothing capacitor from being charged by leakage current that flows while electrical generation is halted, so that erroneous indications by the charging warning lamp can be prevented.

However, depending upon the forms of windings that are utilized, the AC generator apparatus may be of a first type, i.e., type A, whereby a high level of output current is produced when the frequency is within a high frequency range, or of a second type, i.e., type B, whereby a high level of output current is produced when the frequency is within a low frequency range. If a generator control apparatus is manufactured such that the aforementioned threshold value for detection of the frequency of the phase voltage is set at a high frequency fA that is suitable for an AC generator apparatus of type A, then it is possible that when that generator control apparatus is used with an AC generator apparatus that is of type B, the charging warning lamp will remain off even when the vehicle ignition is switched on but electrical generation is not occurring. Conversely, if the generator control apparatus is manufactured such that the threshold value used for detection of the frequency of the phase voltage is set at a low frequency fB that is suitable for an AC generator apparatus of type B, then it is possible that when the generator control apparatus is used with an AC generator apparatus that is of type A, the charging warning lamp will remain off even when the level of electric current that is being generated is insufficient to perform battery charging.

Hence, with such a prior art method, it is not possible to provide a single type of generator control apparatus that will be suitable for use with AC generator apparatuses that may be of type A or type B. It has thus been necessary to use a plurality of different types of generator control apparatus, incorporating respectively different types of leakage compensation circuits, in accordance with the specifications of various types of AC generator apparatus.

One method of detecting the phase voltage of such an AC generator apparatus irrespective of the frequency of that voltage is to detect the lowest frequency component of the phase voltage. However in order to detect a low frequency component it is necessary to use a circuit having a large time constant, so that the leakage compensation circuit will have a complex configuration, i.e., formed of capacitors, resistors, counters, etc. Thus, the overall scale of the generator control apparatus will become large. Moreover, when such a method is used, whereby the lowest frequency component is detected, the charging warning lamp will become turned off when engine cranking is occurring, during engine starting. On observing this, the vehicle driver may erroneously believe that engine starting has been achieved, and so halt the engine cranking operation before engine starting has actually occurred.

SUMMARY OF THE INVENTION

It is an objective of the present invention to overcome the above problems, by providing an AC generator apparatus having a generator control apparatus whereby it is ensured that a charging warning lamp is controlled to provide a reliable indication of the electrical generation status of the AC generator apparatus, irrespective of the effects of leakage current of a rectifier apparatus.

It is a further objective to provide an AC generator apparatus having a generator control apparatus that is applicable to various different types of AC generator apparatus, to thereby minimize the number of different types of such generator control apparatus that must be manufactured, and whereby the generator control apparatus is configured such that the AC generator apparatus can be of compact size.

Basically, the present invention achieves the above objectives by providing a vehicle AC generator apparatus having a rectifier apparatus, and a generator control apparatus which (after the vehicle ignition has been switched on prior to starting the vehicle engine) detects the point at which power generating begins, i.e., when the engine begins to fire, by detecting when the voltage across a rectifier element (in general, a diode) of the rectifier apparatus first becomes higher than the positive-polarity output terminal of the rectifier apparatus, or by detecting when the voltage across a rectifier element first becomes lower (more negative) than the negative-polarity output terminal of the rectifier apparatus. Such a condition first occurs when forward conduction by the rectifier elements begins, after engine starting, and so provides a highly accurate indication of the timing of commencement of power generation operation. Based on that detection, controlled parameters such as the level of current through a charging warning lamp, and the level of excitation current of the generator, can be reliably changed over immediately when engine starting is completed and electric power generation begins.

More specifically, the invention provides an AC generator apparatus for a vehicle equipped with a battery, the AC generator apparatus having a rotor provided with a plurality of field poles, an excitation winding for magnetizing the field poles, a stator having multi-phase windings that are coupled to rotating magnetic fields produced by the rotor for producing a phase voltage, a rectifier apparatus having a plurality of rectifier elements, each of which has a first terminal connected to one of the multi-phase windings and a second terminal connected to a terminal of the battery, with the rectifier apparatus converting AC voltages produced by the multi-phase windings to a DC voltage, and a generator control apparatus for controlling a current flow in the excitation winding to thereby control the AC voltages. The generator control apparatus includes comparator means for comparing respective voltages appearing on the first and second terminals of one of the rectifier element, and control changeover means for performing changeover of a controlled parameter in accordance with comparison results obtained by the comparator means. In that way, by comparing the voltages which appear at opposite ends of a rectifier element of the rectifier apparatus, it is possible to judge whether current is passing through that rectifier element, i.e., whether electrical generation is being performed. Hence, it becomes unnecessary to use a large-scale leakage compensation circuits that detects a frequency of the phase voltage, in order to prevent the occurrence of errors due to leakage currents of the rectifier apparatus. Moreover, due to the fact that a leakage compensation circuit which detects a phase voltage frequency is not utilized, it is unnecessary to manufacture a number of different types of generator control apparatus in accordance with AC generator apparatuses having respectively different output voltage specifications, so that the number of different types of generator control apparatus that must be manufactured can be reduced. In addition, such a generator control apparatus (and hence a vehicle AC generator apparatus incorporating such a generator control apparatus) can be of compact size.

According to another aspect, the invention provides an AC generator apparatus as described above, wherein the control changeover means perform a changeover of a controlled parameter (or of each of a plurality of controlled parameters) when a voltage difference between the first and second terminals of the rectifier element exceeds a predetermined value, corresponding to a value of forward voltage drop of a rectifier element. The electrical generation condition of the AC generator apparatus can thereby be reliably detected, with detection errors due to leakage current being prevented.

According to another aspect, the invention provides an AC generator apparatus as described above, wherein the rectifier elements are diodes. A specific forward direction voltage drop occurs across a diode when current flows through it, and this voltage is detected by comparing the respective voltages at the ends of the diode, with the detected value being used as a basis for performing the changeover of a controlled parameter. Since diodes are generally used as rectifier elements in the prior art, such a generator control apparatus can be economically produced, for use with existing types of AC generator apparatus.

According to another aspect, the invention provides an AC generator apparatus as described above, wherein the control changeover means performs the changeover of the controlled parameter when the phase voltage of the multi-phase windings exceeds a voltage that appears at a positive-polarity output terminal of the rectifier apparatus, or wherein the control changeover means performs the changeover of the controlled parameter when the phase voltage of the multi-phase windings becomes lower (i.e., more negative) than a voltage that appears at a negative-polarity output terminal of the rectifier apparatus. In that way, it is possible to accurately judge when AC generating has started, and changeover of the controlled parameter can thus be performed at a timing when supplying of output current from the AC generator apparatus has actually commenced.

According to another aspect, the invention provides an AC generator apparatus as described above, wherein the controlled parameter which is changed over by the control changeover means is a level of current that flows in a charging warning lamp. In that way, the driver of the vehicle can be reliably notified when charging of the vehicle battery by the output from the AC generator apparatus has started.

According to another aspect, the invention provides an AC generator apparatus as described above, wherein the controlled parameter is the level of current flow in the excitation winding. Output current from the AC generator apparatus begins to be supplied to various electrical loads when engine starting occurs, so that the output voltage from the AC generator apparatus rises above the output voltage of the vehicle battery. The invention enables the timing at which that occurs to be detected to a high degree of accuracy, and so enables an predetermined appropriate level of current to be supplied to the excitation winding during engine cranking when engine starting is being performed, with that level of current being immediately changed to a level that is appropriate for normal electric power generation, when it is detected that engine starting has been completed.

Preferably, a switching element is connected in series with the excitation winding, and the generator control apparatus comprises duty ratio setting means for setting the duty ratio of on/off switching of the switching element. In that case, alteration of the level of current that flows in the excitation winding is performed by altering the value of the duty ratio that is set by the duty ratio setting means. In that way, the level of current flow in the excitation winding can be easily and accurately adjusted.

DESCRIPTION OF PREFERRED EMBODIMENTS

Figure 1:
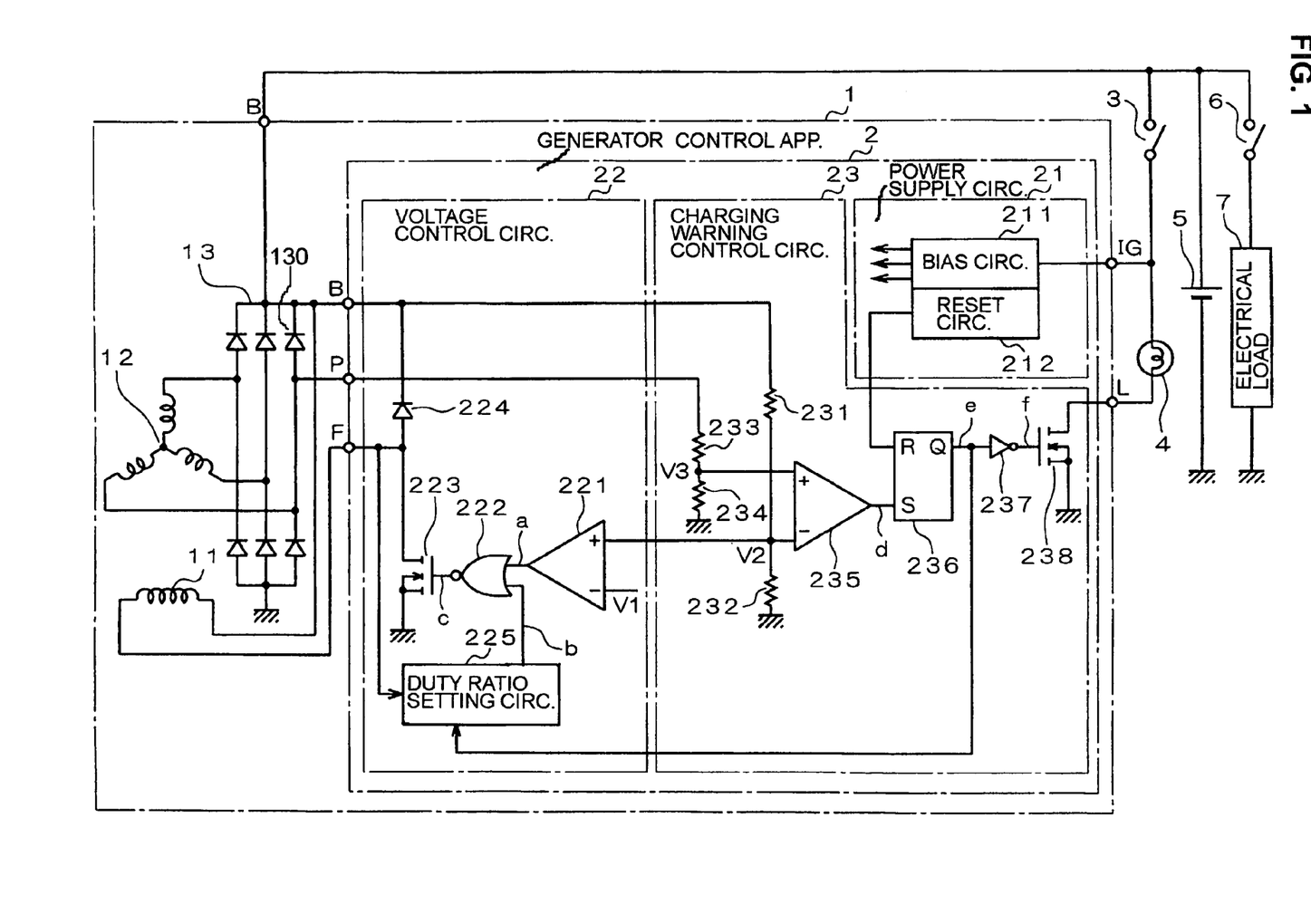
FIG. 1 is a circuit diagram showing the overall configuration of an embodiment of a vehicle AC generator apparatus.

FIG. 1 is a circuit diagram showing the configuration of an embodiment of an AC generator apparatus for a vehicle. In particular, the diagram shows the connection conditions between the AC generator apparatus, designated by numeral 1, and a battery 5, a switch 3, etc. The switch 3 may function also as the ignition switch of the vehicle, i.e., it becomes closed when the vehicle ignition is turned on, prior to performing engine starting. As shown in FIG. 1, the AC generator apparatus 1 is basically made up of an excitation winding 11, an armature winding 12, which in this embodiment is a 3-phase winding, a rectifier apparatus 13 and a generator control apparatus 2.

The AC generator apparatus 1 includes a rotor (not shown in the drawings) having a plurality of field poles (not shown in the drawings) and a stator (not shown in the drawings) having the armature winding 12 wound on a magnetic core. The excitation winding 11 serves to magnetize the field poles of the rotor. The armature winding 12 is formed of multi-phase windings, which in this embodiment are 3-phase windings, to thereby generate a 3-phase AC voltage when the rotor rotates, as a result of rotating magnetic fields which are thereby produced. As shown, the rectifier apparatus 13, which converts the 3-phase AC voltage produced by the armature winding 12 to a DC output voltage, is formed of a set of rectifier elements (in this embodiment, rectifier diodes) coupled to the armature winding 12, with each diode being connected between one end of a phase winding of the armature winding 12 and either a battery connection terminal B or ground potential. One of these rectifier diodes, designated by numeral 130, is connected between the B terminal and a phase voltage terminal P.

The output voltage terminal B of the AC generator apparatus 1 is connected to the positive terminal of the battery 5, and is also connected via the switch 3 to a charging warning lamp 4. The output voltage of the AC generator apparatus 1 is determined by the speed of rotation of the rotor and on the level of excitation current that flows in the excitation winding 11, in combination. That level of excitation current is determined by the generator control apparatus 2

The generator control apparatus 2 includes a power supply circuit 21, a voltage control circuit 22 and a charging warning control circuit 23. The power supply circuit 21 includes a bias circuit 211 and a reset circuit 212. The bias circuit 211 generates various bias voltages and/or power supply voltages which are applied to activate various circuits within the generator control apparatus 2, so that when the switch 3 becomes closed these various circuits are set in operation. The reset circuit 212 generates a reset signal each time the switch 3 becomes closed.

The voltage control circuit 22 includes a voltage comparator 221, a two-input NOR gate 222, a MOS FET 223 functioning as a switching element, a current return diode 224 and a duty ratio setting circuit 225. A reference voltage V1 is applied to the inverting input terminal of the voltage comparator 221, while the non-inverting input terminal receives a voltage V2 that is produced by voltage division of the output voltage of the AC generator apparatus 1, performed by a resistive voltage divider formed of resistors 231 and 232 as shown. The voltage V2 thereby serves for detecting the level of output voltage from the AC generator apparatus 1. The output from the voltage comparator 221, designated as signal a, is applied to one input of the NOR gate 222, whose output is applied to control the 223. The other input terminal of the NOR gate 222 is connected to the output terminal of the duty ratio setting circuit 225. The gate electrode of the MOS FET 223 is connected to the output of the NOR gate 222, while the drain electrode is connected via a diode 224 to the voltage output terminal B of the AC generator apparatus 1, and the source electrode is connected to ground potential. The drain electrode of the MOS FET 223 is also connected to one end of the excitation winding 11, whose other end is connected to the voltage output terminal B of the AC generator apparatus 1. Hence, when the MOS FET 223 is set in the on condition (i.e., conducting between the drain and second electrodes), current flows through the excitation winding 11, with that flow being interrupted when the MOS FET 223 is set in the off state.

The diode 224 serves as a current return diode for the excitation winding 11, i.e., connected in parallel with the excitation winding 11 for conducting a return current through the excitation winding 11 each time the MOS FET 223 is switched to the off state One input of the duty ratio setting circuit 225 is connected to one end of the excitation winding 11 (via the terminal F), with that input being utilized by the duty ratio setting circuit 225 to detect the on/off duty ratio of current flow through the excitation winding 11, controlled by switching operation of the MOS FET 223. A second input of the duty ratio setting circuit 225 is connected to receive a signal e from the Q output terminal of a R-S flip-flop 236 (described hereinafter) within the charging warning control circuit 23. The signal e constitutes a changeover command signal, which controls changeover of respective controlled parameters as described in the following.

The charging warning control circuit 23 is made up of the aforementioned resistors 231, 232, and resistors 233, 234, a voltage comparator 235, the R-S flip-flop 236, an inverter 237 and a switching element constituted by a MOS FET 238. The inverting input terminal of the voltage comparator 235 receives the aforementioned voltage V2. The non-inverting input terminal of the voltage comparator 235 receives a voltage V3 that appears at the junction of the resistors 233, 234, connected as a resistive voltage divider between a phase voltage of the armature winding 12 (transferred from the aforementioned terminal P) and ground potential, so that the voltage V3 serves to detect the level of the phase voltage. The output of the voltage comparator 235 is connected to the S input terminal of the R-S flip-flop 236, while the R terminal of the R-S flip-flop 236 is connected to receive the aforementioned reset signal produced by the reset circuit 212.

The input and output of the inverter 237 are respectively connected to the Q output terminal of the R-S flip-flop 236 and the gate electrode of the MOS FET 238, while the drain electrode of the MOS FET 238 is connected to one terminal of the charging warning lamp 4 and the source electrode is connected to ground potential. When the switch 3 becomes closed, so that the voltage of the battery 5 is applied to the other terminal of the charging warning lamp 4, and the MOS FET 238 is set in the on state, the charging warning lamp 4 is turned on (i.e., is lit), and subsequently when the MOS FET 238 is set in the off state, the charging warning lamp 4 is thereby turned off.

Figure 2:
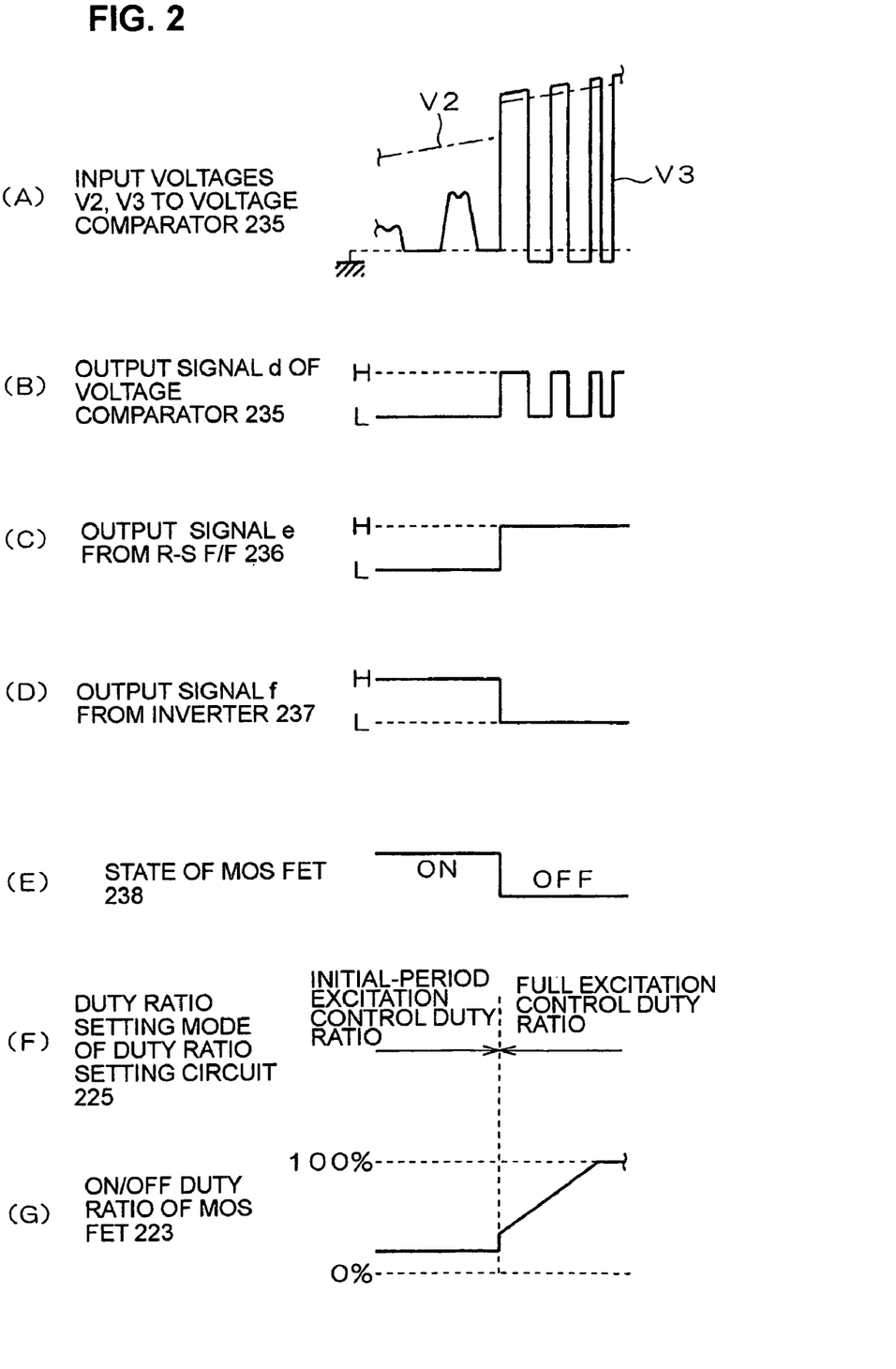
FIGS. 2(A)–2(G) show timing diagrams for use in describing the operation of a generator control apparatus shown in FIG. 1.

The operation of this embodiment will be described in the following, referring to the waveform diagrams of FIG. 2, which illustrate various waveforms and timing relationships of the embodiment. When the switch 3 is closed, prior to engine starting, the battery voltage is thereby supplied to the power supply circuit 21, setting the bias circuit 211 and reset circuit 212 in operation. Output voltages produced from the bias circuit 211 then activate the voltage control circuit 22 and the charging warning control circuit 23.

Operation Prior to Engine Starting

In the voltage control circuit 22 at this time, the voltage V2 applied to the non-inverting input terminal of the voltage comparator 221 is lower than the reference voltage V1 that is applied to the inverting input terminal, so that a low-level output signal (a) is outputted from the voltage comparator 221. Also at this time, the duty ratio setting circuit 225 outputs a duty ratio setting signal b which is inverted by the NOR gate 222 and applied to the gate electrode of the MOS FET 223. This duty ratio setting signal is a pulse train alternating between the high and low levels with a specific duty ratio. The duty ratio setting circuit 225 is configured such that while the output signal e supplied from the R-S flip-flop 236 is at the L level, the duty ratio setting signal controls switching of the MOS FET 223 whereby the level of excitation current passed through the excitation winding 11 at this time, referred to herein as the initial-period excitation current, is fixed at a predetermined value. That value may for example be several percent of the current level that flows in the excitation winding 11 during normal (i.e., full excitation) operation. While the output signal a from the voltage comparator 221 is at the low level, when the duty ratio setting signal is at a high level (referred to in the following as the H level), a low level (referred to in the following as L level, i.e., ground potential, with this embodiment) output is thereby produced from the NOR gate 222, so that the 223 is held in the off (non-conducting) state, while when the duty ratio setting signal is at the L level, with a H level output thereby produced from the NOR gate 222, the MOS FET 223 is held in the on (i.e., conducting) state (FIG. 2(F), (G)).

When the switch 3 is closed and the reset circuit 212 of the power supply circuit 21 is thereby activated, it momentarily applies a reset (H level) signal to the R terminal of the R-S flip-flop 236 in the charging warning control circuit 23, thereby setting the changeover command signal e from the Q output terminal of the R-S flip-flop 236 to the L level. Thereafter, the output applied from the reset circuit 212 of the bias circuit 211 to the R terminal of the R-S flip-flop 236 is held at the L level. At this time, the voltage V3 applied to the non-inverting input terminal of the voltage comparator 235 is lower than the reference voltage V2 applied to the inverting input terminal (V3<V2, as shown in FIG. 2(A)), so that the output (signal d) from the voltage comparator 235 is at the L level (FIG. 2(B)). Hence, the output terminal Q of the R-S flip-flop 236 remains at the L level (FIG. 2(C)) so that the signal e from the R-S flip-flop 236 is inverted to a H level signal f by the inverter 237, which thereby switches the MOS FET 238 to the on condition (FIG. 2(D)). The charging warning lamp 4 is thereby turned on, indicating to the vehicle driver that the AC generator apparatus 1 is not generating an output voltage.

Operation Following Engine Starting

When the driver then actuates the ignition key to drive the starter motor of the vehicle, so that engine cranking is performed, the resultant rotating magnetic field produced by the rotor results in a 3-phase AC voltage being generated by the armature winding 12. A phase voltage thereby appears at the P terminal of the generator control apparatus 2, having a period determined by the speed of rotation of the rotor. When the engine then begins to fire (i.e., engine starting is achieved) the peak level of the phase voltage suddenly increases, until it exceeds the voltage appearing at the B terminal by an amount exceeding the forward voltage drop of the rectifier diodes of the rectifier apparatus 13. At that point, supplying of current from the AC generator apparatus 1 to the battery 5 begins.

When the input voltage V3 applied to the non-inverting input terminal of the voltage comparator 235 becomes higher than the input voltage V2 applied to the inverting input terminal (V3>V2, FIG. 2(A)), the output signal d from the voltage comparator 235 changes from the L to the H level. Since this signal is applied to the S input terminal of the R-S flip-flop 236, the changeover command signal e from the Q output terminal of the R-S flip-flop 236 changes from the L to the H level (FIG. 2(C)) and is thereafter held at the H level. The resultant L level signal f from the inverter 237 switches off the MOS FET 238 (FIG. 2(D), (E)), so that the charging warning lamp 4 is turned off. The vehicle driver is thereby notified that electric power generating operation has started.

When the changeover command signal e changes from the H to the L level, the duty ratio setting circuit 225 changes the duty ratio of the duty ratio setting signal b from a low value that is appropriate for initial-period control into a range of values that are determined in accordance with the output voltage produced by the AC generator apparatus 1, i.e., the output voltage from the positive-polarity output terminal of the rectifier apparatus 13. That output voltage will be referred to in the following as Vb. As a result, the conduction factor (determined by the duty ratio of on/off operation) of the MOS FET 223 is gradually increased until a requisite level of excitation current is flowing in the excitation winding 11 (FIG. 2(G)).

The voltage which appears at the drain electrode of the MOS FET 223, and the changeover command signal e from the output terminal Q of the R-S flip-flop 236, are supplied to respective input terminals of the duty ratio setting circuit 225. The duty ratio setting circuit 225 is configured such that, when the changeover command signal e goes to the H level (i.e., when the voltage V3 first exceeds V2, subsequent to closing of switch 3) the duty ratio setting circuit 225 performs excitation control utilizing the voltage appearing at terminal F as a feedback signal expressing the actual on/off duty ratio of current flow through the excitation winding 11, controlled by the MOS FET 223. When the excitation current is to be increased or decreased, an appropriate amount is added to or subtracted from the value of duty ratio of the feedback signal, to thereby obtain the duty ratio used for the duty ratio setting signal b. With this embodiment, an increase in the excitation current is achieved by increasing the L level/H level duty ratio of the duty ratio setting signal, since that is inverted by the NOR gate 222.

Immediately following each switch-off of the MOS FET 223, when a return current thereby flows through the current return diode 224, the potential at terminal F becomes substantially equal to voltage Vb. Hence, the feedback signal can also be used by the duty ratio setting circuit 225 to detect the level of output voltage of the AC generator apparatus 1. However it would be equally possible for some other arrangement to be provided for that purpose. The duty ratio setting circuit 225 is configured to detect (e.g., based on the feedback signal) when the output voltage Vb of the AC generator apparatus 1 attains a predetermined value such as 14.5 V. referred to in the following as the adjustment value and to halt the gradual increasing of the duty ratio of on/off operation of the MOS FET 223 (as commanded by the duty ratio setting signal b) when this occurs. That condition is indicated FIG. 2(G) as the "100%" level being reached (i.e., this does not necessarily signify a duty ratio of 100%).

If the output voltage Vb of the AC generator apparatus 1 subsequently exceeds the adjustment value, for example due to the vehicle engine speed being increased, the voltage V2 applied to the non-inverting input terminal of the voltage comparator 221 becomes higher than the reference voltage V1, so that the output signal a from the voltage comparator 221 goes from the L to the H level. The output signal c from the NOR gate 222 thereby goes to the L level, holding the MOS FET 223 in the off state and thereby interrupting the flow of current in the excitation winding 11, so that voltage Vb becomes lower. When the voltage V2 thereby subsequently becomes lower than the reference voltage V1, periodic switching of current through the excitation winding 11 by the MOS FET 223 in accordance with the duty ratio setting signal b, is resumed. However at this time, the duty ratio setting circuit 225 reduces the duty ratio expressed by the duty ratio setting signal b appropriately, for example based on the amount by which the adjustment value was exceeded, such that the excitation current level will be appropriately reduced. In that way, the output voltage of the AC generator apparatus 1 is regulated to a predetermined value.

Thereafter, when the switch 6 is closed to apply the electrical load 7 to the AC generator apparatus 1 and the voltage of the battery 5 thereby falls, with the voltage V2 thereby falling below the reference voltage V1, the duty ratio setting circuit 225 performs duty ratio control of the MOS FET 223 whereby the excitation current in the excitation winding 11 is gradually increased, so that the output current from the AC generator apparatus 1 gradually increases, and hence voltage Vb gradually rises until the aforementioned adjustment value is reached. Similar operations occur if the vehicle engine speed is reduced, so that voltage Vb falls below the adjustment value.

Generally, the output voltage of the AC generator apparatus 1 will contain high-frequency noise components such as ignition noise, ripple, inverter operation noise, switching noise, etc. By utilizing the voltage comparators 221, 235 of this embodiment, effects of these noise components are effectively excluded. In addition, although not shown in the drawings, the comparators are configured such as to apply specific amounts of delay, in order to ensure stable operation of circuits which operate based on the output signals from them.

Operation When Rectifier Diode Leakage Current Occurs

The operation will now be described for the case in which a significant level of diode leakage current flows between the P and B terminals to which the rectifier apparatus 13 is connected. Designating the values of the resistors 231 and 232 as R1 and R2 respectively, and the ratio R1/R2 as a1, and similarly designating the values of the resistors 233 and 234 as R3 and R4 respectively, and the ratio R3/R4 as a2, the case will first be considered in which a1=a2.

When leakage current flows between the B and P terminals of the generator control apparatus 2, i.e., the leakage current of the rectifier diode 130 in the example of FIG. 1, this can be expressed as a corresponding leakage resistance component rL existing between these terminals. The voltage V3 is determined by the voltage of battery 5, the ratio a2, and the resistance values rL, R3, R4. When the switch 3 is first closed, as described hereinabove, it is necessary that voltage V3 be lower than V2, so that the R-S flip-flop 236 will remain in the reset condition until the phase voltage from the armature winding 12 exceeds voltage Vb. If a substantially high level of leakage current flows through the resistors 233, 234 before electric power generating begins, with the ratios a1 and a2 mutually identical, the voltage V3 may rise above V2, thereby prematurely setting the R-S flip-flop 236 and causing the charging warning lamp 4 to be turned off. However by suitably setting the ratios a1 and a2 and the values R3, R4, it can be ensured that this will not occur, i.e., that the essential initial condition (V3<V2) is reliably established even if there is a significant level of leakage current.

Specifically, the ratio a2 must be established with respect to the ratio a1, and the values R3, R4 selected in relation to rL, such that both the following conditions are satisfied:

(a) even when a worst-case condition of rectifier diode leakage current flow occurs (i.e., minimum anticipated value of rL) before electric power generating begins, V3 will remain lower than V2, and (b) when forward current flow through the rectifier diodes begins, so that the diode voltage drop appears between the B and P terminals, V3 will become higher than V2.

It can be understood that specific values for the resistors 231 to 234 can be readily calculated, based on particular values of diode voltage drop, anticipated minimum value of rL, etc. Assuming the ratio a1 to be fixed, the values for resistors 233, 234 and the ratio a2 should be selected such that, when the same potential is applied across the series-connected resistors 233, 234 and across the series-connected resistors 231, 232, V3 will be lower than V2 by an amount that would be sufficient to offset any increase in V3 due to leakage current, but is less than the value of forward voltage drop of a rectifier diode.

It can thus be reliably ensured that the charging warning lamp 4 becomes lit (due to resetting of the R-S flip-flop 236) when switch 3 is closed prior to engine starting, and is turned off only when electric power generation operation of the AC generator apparatus 1 has actually started, so that the diodes of the rectifier apparatus 13 start to be driven into forward conduction.

As can be understood from the above description, it is a basic feature of this embodiment that the respective voltages which appears at opposite terminals of a rectifier diode are compared, to detect when electric power generating has actually commenced. As a result, erroneous operation can be prevented, without requiring the use of a large-scale leakage compensation circuit that detects the frequency of the phase voltage. Moreover, since it is unnecessary to utilize such a leakage compensation circuit which must be manufactured in accordance with various specifications of vehicle AC generator apparatuses as described hereinabove, a generator control apparatus according to the present invention can be designed for use with various different types of vehicle AC generator apparatus, i.e., having various different specifications. Thus the number of different types of generator control apparatus that must be manufactured can be reduced. In addition, since there is no need to performed detection of the frequency of AC generation, such a generator control apparatus (and hence a vehicle AC generator apparatus using the generator control apparatus) can be small in size and economical to produce.

Moreover, with this embodiment, diodes are used as the rectifier elements of the rectifier apparatus 13, and changeover of one or more controlled parameters is performed based on detecting a forward voltage drop which occurs through one of these diodes when electrical generation begins, by using a comparator. Hence, since the generator control apparatus can utilize a rectification diode which is a standard element of a usual type of vehicle AC generator apparatus, this further enables the generator control apparatus to be produced at low cost.

Moreover with the generator control apparatus 2 of the above embodiment, changeover of the controlled parameters is performed when the phase voltage becomes higher (i.e., more positive) than the potential of the positive-polarity output terminal of the rectifier apparatus 13. Hence, the timing at which electric power generating by the AC generator apparatus 1 actually begins can be very accurately judged, so that when engine starting occurs, control changeover (to turn off the charging warning lamp 4, and to increase the excitation current) can be performed precisely at the time point when output current actually begins to be supplied from the AC generator apparatus 1.

With the above embodiment, the changeover of controlled parameters includes switching the current that flows through a charging warning lamp, i.e., with that current flow being selectively enabled and inhibited to set the lamp in the on and off states respectively. Since it is ensured that current will flow continuously through the charging warning lamp after the vehicle ignition has been switched on but before electric power generation by the AC generator apparatus 1 has definitely commenced, displaying of erroneous indications to the vehicle driver (i.e., by the charging warning lamp being turned off before the AC generator apparatus 1 is fully in operation) can be effectively prevented.

Furthermore in addition to changeover of the lit/unlit condition of the charging warning lamp, with the above embodiment the changeover of controlled parameters further includes changeover of the level of current that flows through the excitation winding 11. With the above embodiment, the point at which voltage Vb becomes higher than the terminal voltage of the battery 5 (so that supplying of current from the AC generator apparatus 1 commences) is accurately detected as the time point at which forward conduction through a rectifier diode begins, as indicated by a forward voltage drop occurring across the diode. At that point, as illustrated in FIG. 2(G), the duty ratio that is set by the duty ratio setting circuit 225 is changed from a fixed predetermined value that is suitable immediately prior to full operation of the AC generator apparatus 1 (i.e., to provide an initial-period excitation current, during engine cranking), to a range of values that are determined based on the output voltage of the AC generator apparatus 1, as required for operation of the AC generator apparatus 1 after engine starting has been completed.

The capability for accurately judging the time point of commencement of supplying current from the AC generator apparatus 1 is highly advantageous, since this substantially coincides with the point at which engine starting is completed, i.e., engine firing begins. This information can be used for example in engine torque control, or in controlling the initial supplying of current from the AC generator apparatus 1, etc.

After the AC generator apparatus 1 enters the full operation condition, the duty ratio setting circuit 225 controls the duty ratio of supplying excitation current to the excitation winding 11 such as to maintain voltage Vb at a predetermined value (the adjustment voltage), by increasing the duty ratio appropriately if an electrical load is applied to the battery 5 or if the vehicle engine speed is reduced, so that the output voltage of the AC generator apparatus 1 must be increased. Conversely, if the engine speed rises or the load supplied by the battery 5 is reduced, causing voltage Vb to rise above the adjustment voltage level, the voltage comparator 221 effects control whereby the supply of current to the excitation winding 11 is halted until voltage Vb returns to the adjustment voltage level, while in addition the excitation current which flows thereafter is reduced to an appropriate level by duty ratio control performed by the duty ratio setting circuit 225. Hence, accurate control of the output voltage Vb of the AC generator apparatus 1 can be readily achieved, while in addition it is ensured that any increase in voltage Vb above the predetermined value is rapidly corrected.

With the embodiment described above, the input voltage V2 of the inverting input terminal of the voltage comparator 235 is derived from the output voltage Vb of the AC generator apparatus 1. However it would be equally possible to derive V2 from the terminal voltage of the battery 5, or the voltage (i.e., IG signal) that appears at the connection between the switch 3 and the charging warning lamp 4.

Moreover with the above embodiment, changeover of the charging warning lamp 4 from the on to the off condition is performed when the phase voltage appearing at the P terminal becomes higher than the voltage at the positive-polarity output terminal of the rectifier apparatus 13. More specifically, that changeover is performed when the phase voltage becomes higher (i.e., more positive) than the positive-polarity output voltage of the rectifier apparatus 13 by an amount that exceeds the forward voltage drop across a rectifier diode of the rectifier apparatus 13. However it would be equally possible to perform that changeover when the phase voltage at the P terminal becomes lower (i.e., more negative) than the voltage appearing at the negative (with the above embodiment, ground potential) terminal of the rectifier apparatus 13. In that case, the non-inverting input terminal of the voltage comparator 235 would be connected to ground potential, and the voltage V3 that is derived by voltage division by the resistors 233, 234 would be inputted to the inverting input terminal of the voltage comparator 235. If this method is used, then the voltage comparator 235 must be configured internally to perform voltage comparison by applying a level shift to the detection voltage received at the inverting input terminal, such that when the voltage applied to the inverting input terminal becomes lower than that applied to the non-inverting input terminal (i.e., falls below ground potential) the output from the voltage comparator 235 will be changed from the L to the H level. In that way, the charging warning lamp 4 would be turned off when the phase voltage appearing at the P terminal first becomes more negative than the voltage at the negative-polarity output terminal of the rectifier apparatus 13 (connected to ground potential, with the above embodiment).

Hence, the essential function of the comparator 235 is to judge whether a voltage difference between the terminal of a rectifier diode that is connected to an armature (phase) winding of the AC generator apparatus 1 and the opposite terminal of that diode (which is connected to the positive-polarity output terminal, and hence to the positive terminal of the battery, or to the negative-polarity output terminal of the rectifier apparatus and hence to the ground terminal of the battery) has attained a polarity corresponding to the direction of current flow through that rectifier diode (i.e, a voltage difference which, if of sufficient magnitude, would produce forward current flow through the diode) to thereby judge whether supplying of current by the AC generator apparatus 1 has commenced, with the changeover command signal (e) produced from the R-S flip-flop 236 being changed from the L to the H level when that commencement is detected.

It should thus be understood that the invention is not limited to the embodiment described above, and that various modifications or alternative configurations could be envisaged, which fall within the scope claimed for the invention, as set out in the appended claims.

What is claimed is:

1. An AC generator apparatus for a vehicle equipped with a battery, comprising
    a rotor having a plurality of field poles,
    an excitation winding for magnetizing said field poles,
    a stator having a multi-phase armature winding coupled to rotating magnetic fields produced by said rotor for producing a multi-phase AC voltage,
    a rectifier apparatus having a plurality of rectifier elements each having a first terminal connected to said multi-phase armature winding and a second terminal connected to a terminal of said battery, with said rectifier apparatus converting said multi-phase AC voltage to a DC voltage, and
    a generator control apparatus for controlling a current flow in said excitation winding to thereby control said multi-phase AC voltage;
    wherein said generator control apparatus comprises:
    comparator means for comparing respective voltages appearing on said first and second terminals of one of said rectifier elements; and
    control changeover means for performing changeover of at least one controlled parameter in accordance with comparison results obtained by said comparator means.

2. An AC generator apparatus according to claim 1, wherein said control changeover means performs said changeover when a voltage difference between said first and second terminals of said rectifier element attains a predetermined value of forward conduction voltage drop.

3. An AC generator apparatus according to claim 1, wherein said rectifier elements comprise respective diodes.

4. An AC generator apparatus according to claim 1, wherein said control changeover means performs said changeover when a phase voltage of said multi-phase armature winding becomes more positive than a voltage produced at a positive-polarity output terminal of said rectifier apparatus.

5. An AC generator apparatus according to claim 1, wherein said control changeover means performs said changeover when a phase voltage of said multi-phase armature winding becomes more negative than a voltage produced at a negative-polarity output terminal of said rectifier apparatus.

6. An AC generator apparatus according to claim 1 wherein said vehicle is equipped with a charging warning lamp, and wherein said controlled parameter comprises a level of current that flows through said charging warning lamp.

7. An AC generator apparatus according to claim 1, wherein said controlled parameter comprises a level of excitation current that flows in said excitation winding.

8. An AC generator apparatus according to claim 7, comprising a switching element connected in series with said excitation winding, wherein said generator control apparatus comprises duty ratio setting means for setting a duty ratio of on/off switching of said switching element, and wherein said duty ratio setting means is adapted to alter said excitation current level by altering said duty ratio.

9. An AC generator apparatus according to claim 8, wherein said comparator means changes an output signal produced therefrom from a second level to a first level when a voltage difference between said first terminal and said second terminal of said one of said rectifier elements attains a polarity corresponding to a direction of forward conduction through said rectifier element.

10. An AC generator apparatus according to claim 9, wherein said duty ratio setting means is adapted to operate in accordance with said output signal of said comparator means, following activation of said AC generator apparatus, and to thereby to set said duty ratio at a predetermined fixed value during an initial period following said activation, in which said output signal of said comparator means is at said second level, and to thereafter change to an operating mode of setting said duty ratio in accordance with a required value of said DC voltage, when said output signal changes from said second level to said first level.

11. An AC generator apparatus for a vehicle equipped with a battery, comprising
    AC voltage generating means including an excitation winding and a multi-phase armature winding,
    a rectifier apparatus having a plurality of rectifier elements each having a first terminal connected to one of said multi-phase windings and a second terminal connected to a terminal of said battery, with said rectifier apparatus converting a multi-phase AC voltage produced by said multi-phase armature winding to an output DC voltage,
    a generator control apparatus for controlling a current flow in said excitation winding to thereby control said multi-phase AC voltage, and
    activation means operable for activating said generator control apparatus;
    wherein said generator control apparatus comprises:
    changeover command signal generating circuit means coupled to one of said rectifier elements adapted to produce a changeover command signal and to set said changeover command signal at a first level when said activation generator control apparatus is activated and to detect a first occurrence of a condition whereby a voltage difference having a polarity corresponding to a direction of forward current flow through said one of said rectifier elements arises between said first terminal and said second terminal of said one of said rectifier elements, and to set said changeover command signal at a second level when said first occurrence is detected, and
    circuit means responsive to said changeover command signal attaining said second level for changing at least one controlled parameter from a first condition to a second condition.

12. An AC generator apparatus according to claim 11, wherein said vehicle is equipped with a charging warning lamp, and said controlled parameter comprises a level of current passed through said charging warning lamp.

13. An AC generator apparatus according to claim 12, comprising a switching element controlled to selectively pass said current through said charging warning lamp, wherein said switching element is controlled by said changeover command signal to pass said current through said charging warning lamp while said changeover command signal is at said first level thereof and to interrupt said current while said changeover command signal is at said second level thereof.

14. An AC generator apparatus according to claim 11, wherein said controlled parameter comprises a level of excitation current that flows in said excitation winding.

15. An AC generator apparatus according to claim 11, comprising a switching element connected in series with said excitation winding, wherein
   said generator control apparatus comprises duty ratio setting means for setting a duty ratio of on/off switching of said switching element, to thereby control said excitation current, and
   said duty ratio setting means is controlled by said changeover command signal to set said duty ratio at a fixedly predetermined value while said changeover command signal is at said first level thereof and to set said duty ratio at a value that is derived in accordance with said output DC voltage while said changeover command signal is at said second level thereof.

16. An AC generator apparatus-according to claim 11, wherein said rectifier elements comprise respective diodes.

* * * * *